United States Patent
Murakami (10) Patent No.: US 7,173,948 B2
(45) Date of Patent: Feb. 6, 2007

(54) OPTICAL TRANSMISSION/RECEPTION SYSTEM FOR VARIOUS VIDEO SIGNALS

(75) Inventor: Yoshimichi Murakami, Kanagawa-ken (JP)

(73) Assignee: Victor Company of Japan, Limited, Kanagawa-ken (JP)

( * ) Notice: Subject to any disclaimer, the term of this patent is extended or adjusted under 35 U.S.C. 154(b) by 830 days.

(21) Appl. No.: 10/303,921

(22) Filed: Nov. 26, 2002

(65) Prior Publication Data
US 2003/0099011 A1 May 29, 2003

(30) Foreign Application Priority Data
Nov. 29, 2001 (JP) ............ P2001-364115
Oct. 8, 2002 (JP) ............ P2002-294604

(51) Int. Cl.
*H04J 3/02* (2006.01)
*H04J 3/06* (2006.01)
*H04N 7/12* (2006.01)
*H04N 11/02* (2006.01)

(52) U.S. Cl. ......... 370/537; 370/503; 375/240.26; 375/240.28

(58) Field of Classification Search ........ 370/907, 370/473, 535–539; 398/43, 45
See application file for complete search history.

(56) References Cited

U.S. PATENT DOCUMENTS

| | | | |
|---|---|---|---|
| 4,675,861 A | * | 6/1987 | Uttermark .......... 398/98 |
| 4,703,471 A | * | 10/1987 | Fitelson et al. ........ 398/43 |
| 5,321,512 A | * | 6/1994 | Huang ............... 348/607 |
| 5,565,897 A | * | 10/1996 | Kikinis et al. ........ 345/213 |
| 6,594,052 B2 | * | 7/2003 | Hiramatsu et al. ...... 398/140 |
| 2002/0122223 A1 | * | 9/2002 | Gallant et al. ......... 359/110 |
| 2002/0136232 A1 | * | 9/2002 | Dudziak et al. ........ 370/445 |

FOREIGN PATENT DOCUMENTS

| | | |
|---|---|---|
| JP | 04-079528 | 3/1992 |
| JP | 1996-21901 | 3/1996 |

\* cited by examiner

*Primary Examiner*—Ricky Q. Ngo
*Assistant Examiner*—Warner Wong
(74) *Attorney, Agent, or Firm*—Nath & Associates PLLC; Gregory B. Kang; Stanley N. Protigal (57) ABSTRACT

A special-code encoding circuit generates a first special code to be added to a video signal and a second special code to replace a synchronous signal. A multiplex circuit multiplexes the video signal and first and second special codes. An encoding circuit for code conversion performs 8B/10B encoding. A parallel/serial conversion circuit converts parallel data to serial data (bit stream signal). A light emission circuit and a light emission device transmit the bit stream signal as a light signal.

5 Claims, 8 Drawing Sheets

| HORIZONTAL SYNCHRONOUS SIGNAL | VERTICAL SYNCHRONOUS SIGNAL | ACTUAL DATA | IDENTIFIED CONTENT | SPECIAL CODE |
|---|---|---|---|---|
| 1 | 1 | 0 | HORIZONTAL/VERTICAL SYNCHRONOUS SIGNALS PRESENT | A |
| 1 | 0 | 0 | HORIZONTAL SYNCHRONOUS SIGNAL PRESENT | B |
| 0 | 1 | 0 | VERTICAL SYNCHRONOUS SIGNAL PRESENT | C |
| 0 | 0 | 0 | WITHOUT HORIZONTAL/VERTICAL SYNCHRONOUS SIGNALS | D |
| 0 | 0 | 1 | VIDEO DATA START POINT | E |
| 0 | 0 | 1 | VIDEO DATA END POINT | F |
| 0 | 0 | 1 | AUDIO DATA START POINT | G |
| 0 | 0 | 1 | AUDIO DATA END POINT | H |
| 0 | 0 | 1 | CONTROL DATA START POINT | I |
| 0 | 0 | 1 | CONTROL DATA END POINT | J |
| 0 | 0 | 1 | OTHER DATA START POINT | K |
| 0 | 0 | 1 | OTHER DATA END POINT | L |

FIG.7A VERTICAL SYNCHRONOUS SIGNAL

FIG.7B HORIZONTAL SYNCHRONOUS SIGNAL

FIG.7C ACTUAL DATA

FIG.7D MULTIPLEX SIGNAL   ACCCCCCACCCCCCCBDI\*\*JDBDE\*\*\*FD§§ BDE\*\*FDBDG\*\*\*HDACCCCCCACCCCCC

OPTICAL TRANSMISSION/RECEPTION SYSTEM FOR VARIOUS VIDEO SIGNALS

BACKGROUND OF THE INVENTION

1. Field of the Invention

The present invention relates to an optical transmission/reception system in which information such as video and audio signals are transmitted/received by light.

2. Description of the Related Art

It has been proposed that radio transmission by light, not by a cable for transmitting electric signals, be used to supply video signals generated by video generation apparatuses such as a video tape recorder to video display apparatuses such as a television receiving set. This type of technique is described as one example in Jpn. Pat. Appln. KOKOKU Publication No. 1996-21901.

A conventional optical transmission/reception system has had a problem that it is difficult to transmit/receive high-capacity signals such as a high vision (high definition) video signal. Moreover, a way of transmitting a plurality of video signals different in format from one another has not been considered in a conventional optical transmission/reception apparatus. Therefore, as problems, the video signal which cannot be displayed by the video display apparatus cannot be transmitted/received, and display capability of the video display apparatus cannot be fulfilled at the maximum.

SUMMARY OF THE INVENTION

The present invention has been developed in consideration of such problems, and an object of the present invention is to provide an optical transmission/reception system in which a high vision video signal can be transmitted/received. Another object of the present invention is to provide an optical transmission/reception system capable of transmitting/receiving and displaying even a video signal which cannot originally be displayed by a video display apparatus and capable of fulfilling display capability of the video display apparatus at the maximum.

To achieve the object, there is provided an optical transmission apparatus for use in an optical transmission/reception system in which an electric signal comprising a digital signal including at least a video signal and a synchronous signal of the video signal is converted to a light signal and then transmitted and in which the light signal is received and converted to the electric signal comprising the digital signal, the apparatus comprising: first encoding means for generating a first identification code to be added to the video signal and a second identification code to replace the synchronous signal, the first identification code and the second identification code indicating a position of the video signal and a position of the synchronous signal, respectively; multiplex means for multiplexing the video signal and the first and second identification codes to output a signal obtained by the multiplexing as a first data string which has a first bit number; second encoding means for converting an output of the multiplex means to a second data string which has a second bit number larger than the first bit number; bit stream conversion means for converting the second data string to a bit stream signal; and light emission means for transmitting the bit stream signal as the light signal.

Moreover, to achieve the object, there is provided an optical transmission apparatus for use in an optical transmission/reception system in which an electric signal comprising a digital signal including at least a video signal and a synchronous signal of the video signal is converted to a light signal and then transmitted and in which the light signal is received and converted to the electric signal comprising the digital signal, the apparatus comprising: first encoding means for generating a first identification code to be added to the video signal and a second identification code to be added to the synchronous signal, the first identification code and the second identification code indicating a position of the video signal and a position of the synchronous signal, respectively; multiplex means for multiplexing the video and synchronous signals and the first and second identification codes to output a signal obtained by the multiplexing as a first data string which has a first bit number; second encoding means for converting an output of the multiplex means to a second data string which has a second bit number larger than the first bit number; bit stream conversion means for converting the second data string to a bit stream signal; and light emission means for transmitting the bit stream signal as the light signal.

Furthermore, to achieve the object, there is provided an optical reception apparatus for use in an optical transmission/reception system in which an electric signal comprising a digital signal including at least a video signal and a synchronous signal of the video signal is converted to a light signal including the video signal, a first identification code to be added to the video signal, and a second identification code to replace the synchronous signal and transmitted and in which the light signal is received and converted to the electric signal comprising the digital signal, the apparatus comprising: light reception means for receiving the light signal and converting the light signal to an electric bit stream signal; conversion means for converting the electric bit stream signal to a first data string which has a first bit number; first decoding means for converting an output of the conversion means to a second data string which has a second bit number smaller than the first bit number; and second decoding means for separating the video signal based on the first identification code included in the second data string and generating the synchronous signal based on the second identification code.

Additionally, to achieve the object, there is provided an optical reception apparatus for use in an optical transmission/reception system in which an electric signal comprising a digital signal including at least a video signal and a synchronous signal of the video signal is converted to a light signal including the video signal and first and second identification codes to be added to the video and synchronous signals respectively and transmitted and in which the light signal is received and converted to the electric signal comprising the digital signal, the apparatus comprising: light reception means for receiving the light signal and converting the light signal to an electric bit stream signal; conversion means for converting the electric bit stream signal to a first data string which has a first bit number; first decoding means for converting an output of the conversion means to a second data string which has a second bit number smaller than the first bit number; and second decoding means for separating the video and synchronous signals respectively based on the first and second identification codes included in the second data string.

Moreover, to achieve the object, there is provided an optical relay apparatus for use in an optical transmission/reception system in which an electric signal comprising a digital signal including at least a video signal and a synchronous signal of the video signal is converted to a light signal and then transmitted by an optical transmission apparatus and in which the light signal is received and converted to the electric signal comprising the digital signal by an optical reception apparatus, the optical relay apparatus comprising: light reception means for receiving the light signal from the optical transmission apparatus and outputting an electric first bit stream signal including the video and synchronous signals; serial/parallel conversion means for converting the electric first bit stream signal to first parallel data; timing adjustment means for re-sampling the first parallel data based on a predetermined clock and thereby adjusting a timing thereof; parallel/serial conversion means for converting second parallel data outputted from the timing adjustment means to serial data and outputting the serial data as an electric second bit stream signal; and light emission means for transmitting the electric second bit stream signal as the light signal to the optical reception apparatus.

The nature, principle and utility of the invention will become more apparent from the following detailed description when read in conjunction with the accompanying drawings.

DESCRIPTION OF THE PREFERRED EMBODIMENTS

An optical transmission/reception system of the present invention will be described hereinafter with reference to the accompanying drawings.

Figure 8A:
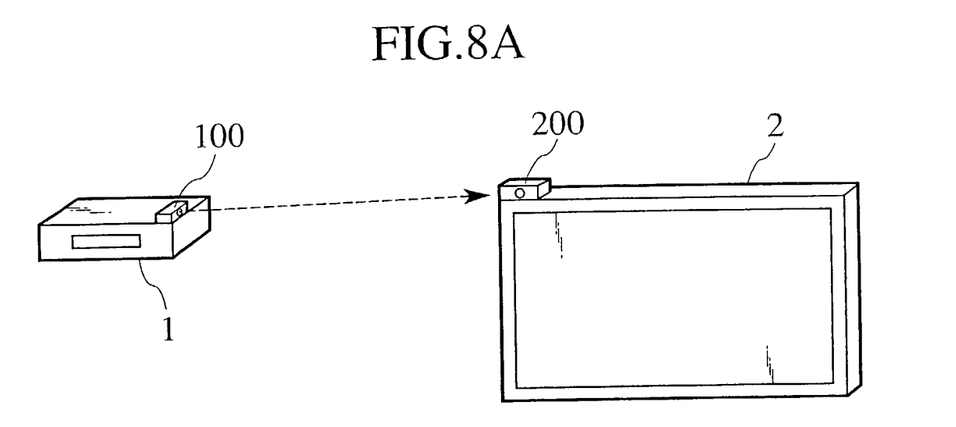
FIGS. 8A and 8B are perspective views showing schematic constitution examples of the optical transmission/reception system of the present invention.

First, a schematic constitution example of the optical transmission/reception system of the present invention will be described. In FIG. 8A, an optical transmission apparatus 100 is attached to a video generation apparatus 1 such as a video tape recorder. It is to be noted that the optical transmission apparatus 100 may be integral with or separate from the video generation apparatus 1. The video generation apparatus 1 generates not only a video signal but also an audio signal. In the following description, for simplicity, the video signal and audio signal will sometimes be referred to simply as the video signal. The video signal generated by the video generation apparatus 1 is converted to a light signal and then transmitted by the optical transmission apparatus 100.

An optical reception apparatus 200 is attached to a video display apparatus 2 such as a television receiving set. Here, the use of a plasma display panel display apparatus (PDP) as the video display apparatus 2 is described. It is to be noted that the optical reception apparatus 200 may be integral with or separate from the video display apparatus 2. The optical reception apparatus 200 receives the light signal transmitted from the optical transmission apparatus 100. The light signal received by the optical reception apparatus 200 is converted to the video signal which can be displayed in the video display apparatus 2, and supplied to the video display apparatus 2.

Figure 8B:
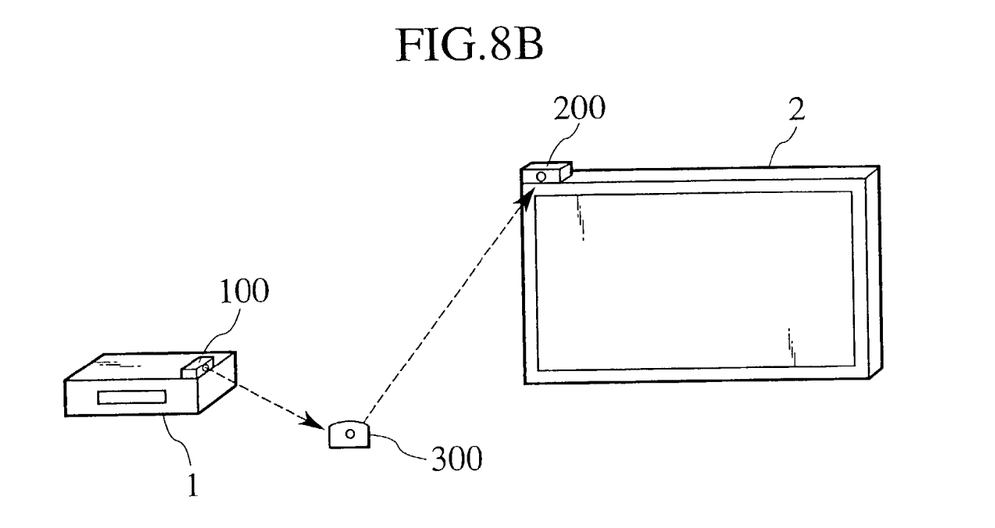

FIG. 8B shows a constitution in which an optical relay apparatus 300 is disposed between the optical transmission apparatus 100 and optical reception apparatus 200. The light signal transmitted by the optical transmission apparatus 100 is once received by the optical relay apparatus 300, and the optical relay apparatus 300 transmits the light signal to the optical reception apparatus 200.

Figure 1:
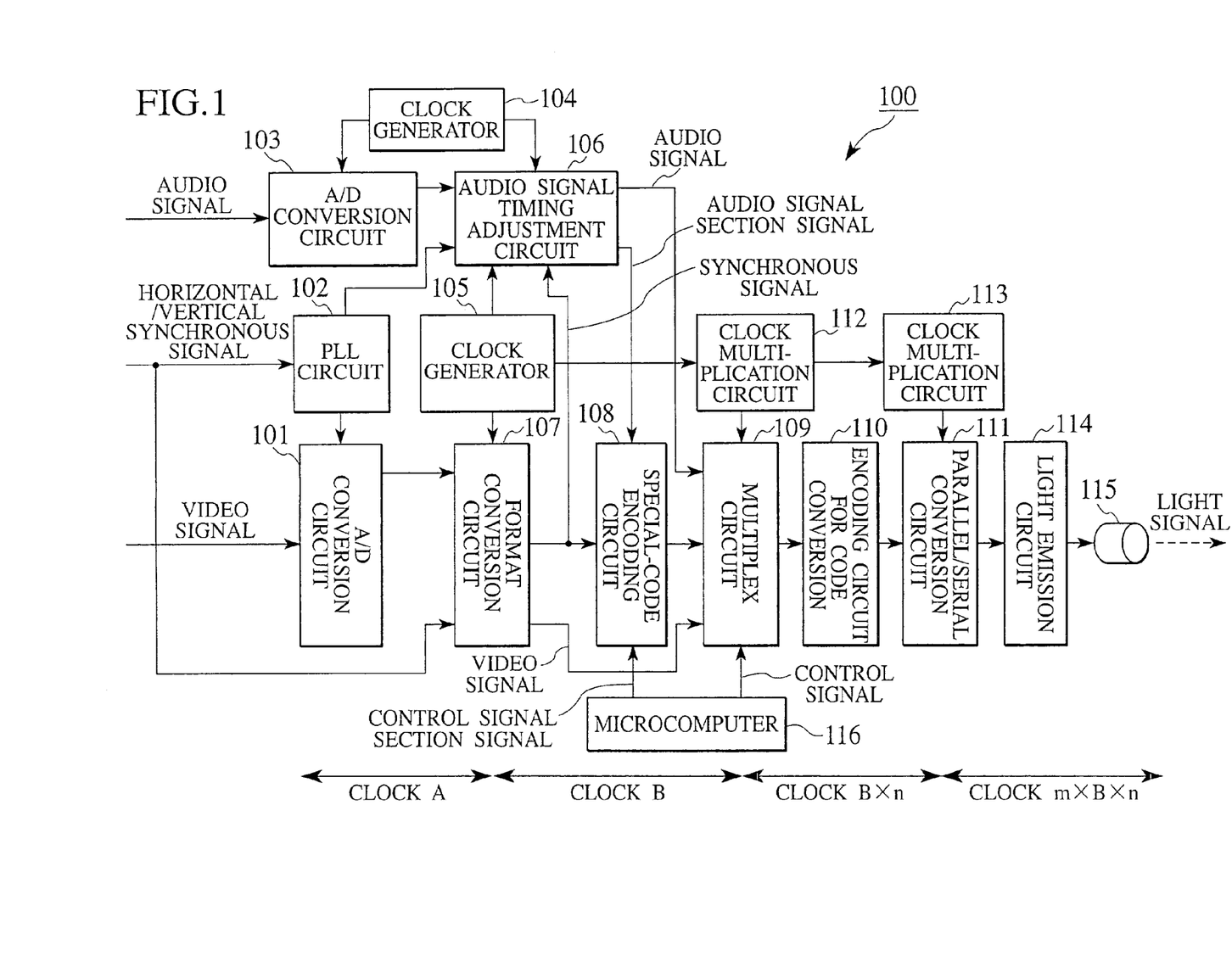
FIG. 1 is a block diagram showing one embodiment of an optical transmission apparatus for use in an optical transmission/reception system of the present invention.

Embodiments of the optical transmission apparatus 100, optical reception apparatus 200, and optical relay apparatus 300 will next be described in detail. FIG. 1 shows the embodiment of the optical transmission apparatus 100. In FIG. 1, an electric analog video signal is inputted into an A/D conversion circuit 101 and converted to a digital video signal. Horizontal and vertical synchronous signals are inputted into a PLL circuit 102, and the PLL circuit 102 generates a sampling clock necessary for the A/D conversion circuit 101 to sample the analog video signal, and supplies the clock to the A/D conversion circuit 101. This sampling clock is referred to as clock A. The horizontal and vertical synchronous signals will hereinafter be referred to simply as the synchronous signals.

An electric analog audio signal is inputted into an A/D conversion circuit 103 and converted to a digital audio signal. A clock generator 104 generates the sampling clock necessary for sampling the analog audio signal, and supplies the clock to the A/D conversion circuit 103.

In the present embodiment, since an input signal is an analog signal, the A/D conversion circuits 101, 103 are required. When the input signal is a digital signal, the A/D conversion circuits 101, 103 are not required. Moreover, when the input signal is the digital signal in the constitution of FIG. 1, the digital video signal is directly inputted into a format conversion circuit (pixel density conversion circuit) 107 described later, and the digital audio signal may directly be inputted into an audio signal timing adjustment circuit 106 described later.

Additionally, a high vision video signal is processed as an interlace data(1125I) having 1125 scanning lines in total and a ratio of 60 fields/second or as a progressive data (750P) with 750 scanning lines in total and a ratio of 60 frames/second. Assuming that the high vision video signals are Y, Pb, Pr and data has a sampling ratio of 4:2:2 and 16 bits, to transmit the high vision video signal as the digital signal, a total scanning line period of 1.188 Gbps and an effective video period of nearly 1.0 Gbps are necessary. In the present embodiment, a data transmission speed is 1.0 Gbps.

The digital video signal and synchronous signal are inputted into the format conversion circuit 107. A clock generator 105 supplies a clock B which has a frequency different from that of the clock A to the format conversion circuit 107, audio signal timing adjustment circuit 106, and clock multiplication circuit 112. The format conversion circuit 107 changes a video size (line number and pixel number) and horizontal and vertical synchronous frequencies so that the digital video signal having a rate (frequency) of the clock A is converted to a digital video signal having a rate of the clock B. After the format conversion by the format conversion circuit 107, the respective circuits up to a light emission device 115, relating to the processing of the video signal, operate based on the clock B or a clock obtained by multiplying the clock B.

The format conversion circuit 107 is constituted to convert the video signal into a format which can be displayed by the video display apparatus 2 and in which display capability of the video display apparatus 2 can be fulfilled at the maximum. That is, with the analog input signal having the number of lines or pixels which cannot be displayed in the video display apparatus 2, the line or pixel number is reduced. When the analog input signal does not satisfy the maximum display capability of the video display apparatus 2, the line or pixel number is increased. The optical transmission apparatus 100 of the present embodiment including the format conversion circuit 107 is effective, particularly when the video display apparatus 2 has a fixed display line number and pixel number like PDP.

In the format conversion circuit 107, when there are a plurality of formats of the inputted video signal, the video size is converted in accordance with each format. At this time, when the display capability of the video display apparatus 2 for use in combination with the optical transmission/reception system of the present invention is predetermined, the format conversion circuit 107 may be converted to one format. When the optical transmission/reception system of the present invention is used in combination with the video display apparatus 2 having various display capabilities, the format needs to be converted in accordance with each display capability of the video display apparatus 2. The format conversion in the format conversion circuit 107 may also be constituted so as to be switched by a user.

The digital audio signal outputted from the A/D conversion circuit 103, clock outputted from the PLL circuit 102, clocks outputted from the clock generators 104, 105, and synchronous signal outputted from the format conversion circuit 107 are inputted into the audio signal timing adjustment circuit 106. The audio signal timing adjustment circuit 106 buffers the inputted audio signal, adjusts a timing so that the audio signal is positioned in a blanking period of the video signal outputted from the format conversion circuit 107, and supplies the signal to a multiplex circuit 109. At the same time, the audio signal timing adjustment circuit 106 generates an audio signal section signal indicating the position of the audio signal, and supplies the signal to a special-code encoding circuit 108.

Among the video and synchronous signals format-converted by the format conversion circuit 107, the video signal is inputted into the multiplex circuit 109, and the synchronous signal is inputted into the special-code encoding circuit 108. A control signal section signal which is generated by a microcomputer 116 as a control unit and which indicates a section with the control signal positioned therein is also inputted into the special-code encoding circuit 108. The special-code encoding circuit 108 generates various signals such as a special code based on the inputted synchronous signal, audio signal section signal, and control signal section signal, and supplies the signals to the multiplex circuit 109.

The special code is an identification code for distinguishing the video signal, audio signal, control signal, and synchronous signal from one another and identifying the positions of the respective signals. The special code is generated in accordance with the positions of data of the video, audio, control, and synchronous signals by the multiplex circuit 109. Details of a concrete constitution of the special-code encoding circuit 108 and the special code will be described later with reference to FIG. 2.

The clock multiplication circuit 112 multiplies the inputted clock B to generate a clock B×n which has a frequency n times that of the clock B (n is a rational number of 1 or more). This clock B×n is inputted into the multiplex circuit 109 and clock multiplication circuit 113. The multiplex circuit 109 multiplexes actual data of at least the video, audio, and control signals and the special code, superimposes the data and code upon the same parallel data line, and outputs, for example, eight-bits parallel data. As described later, the circuit may also be constituted so as to multiplex the actual data of the video, audio, and control signals, the synchronous signal, and the special code as described later.

As one example, assuming that the video signals into the multiplex circuit 109 are Y, Pb, Pr which each is a 16-bits data and which have a sampling ratio of 4:2:2, to superimpose this 16-bits parallel data upon 8-bits data line in time division, n needs to be two, that is, a clock having a frequency twice that of the clock B is necessary. In principle, n in the clock B×n is the rational number of 1 or more as described above, and is preferably an integer.

The parallel data outputted from the multiplex circuit 109 is inputted into an encoding circuit for code conversion 110. The encoding circuit for code conversion 110 encodes and converts the code, for example, into a ten-bits code so as to obtain a uniform frequency component (uniform appearance frequencies of 0 and 1 in a given time) of the parallel data and to secure a bit allocation for the special code in the special-code encoding circuit 108.

The output of the encoding circuit for code conversion 110 is inputted into a parallel/serial conversion circuit 111. The clock multiplication circuit 113 multiplies the inputted clock B×n to generate a clock m×B×n which has a frequency m times that of the clock B×n (m is an integer larger than the bit number of the input signal of the parallel/serial conversion circuit 111). Since the output of the encoding circuit for code conversion 110 is of ten bits in the above-described example, m is ten. This clock m×B×n is inputted into the parallel/serial conversion circuit 111. The parallel/serial conversion circuit 111 uses the clock m×B×n to convert the output of the encoding circuit for code conversion 110 to serial data, and inputs the data as a bit stream signal into a light emission circuit 114.

The light emission circuit 114 converts a voltage level of the inputted bit stream signal to a driving voltage level of the light emission device 115, and supplies the level to the light emission device 115. As a preferred embodiment, a semiconductor laser is used as the light emission device 115. The light emission device 115 establishes one-to-one correspondence between high/low of the bit stream signal and on/off of light, converts the bit stream signal into a light signal, and transmits the light signal. When the semiconductor laser is used as the light emission device 115, a high-capacity signal (giga bps class) such as a digital high vision video signal can be transmitted.

It is to be noted that an encryption, scramble, or compression circuit may be inserted between the A/D conversion circuit 101 and parallel/serial conversion circuit 111 in order to encrypt the video or audio signal or to scramble or compress the signal. With the semiconductor laser for use as the light emission device 115, it is natural to use the laser which does not adversely affect human eyes to the utmost. Further to secure safety, a diffusion lens for diffusing the light may also be disposed in a stage subsequent to the light emission device 115.

Figure 2:
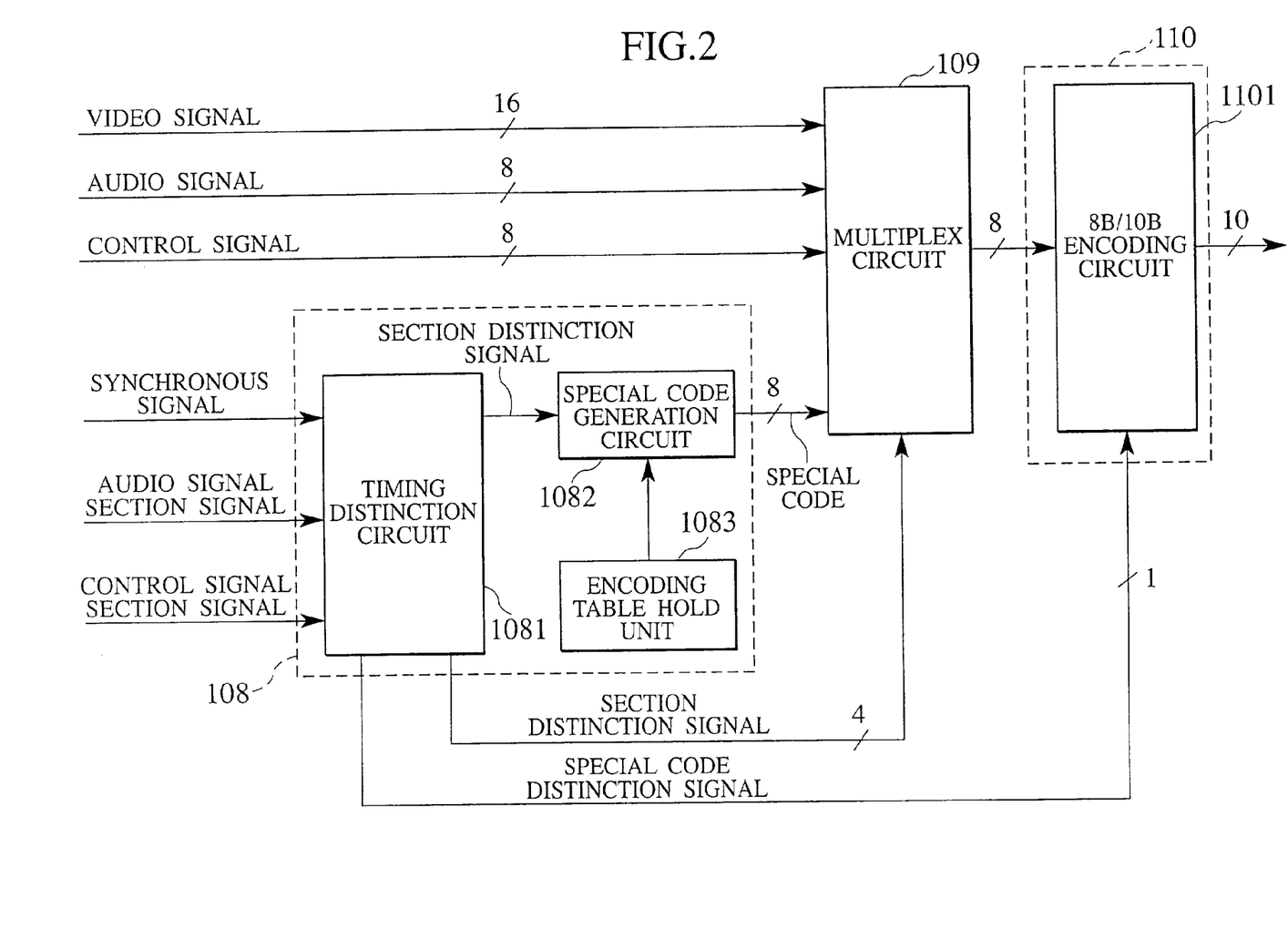
FIG. 2 is a partial detailed block diagram of FIG. 1.

Here, a concrete constitution example of the special-code encoding circuit 108 to the encoding circuit for code conversion 110 will be described in detail with reference to FIG.

2. In FIG. 2, the horizontal and vertical synchronous signals, audio signal section signal, and control signal section signal are inputted into the special-code encoding circuit 108. The video, audio, and control signals are inputted into the multiplex circuit 109. The video signal is of 16 bits as described above, and each of the audio and control signals is of eight bits as one example.

The control signal generated by the microcomputer 116 includes a control signal for adjusting video display characteristics (such as color temperature) in the video display apparatus 2, and a control signal for adjusting a sound volume of a speaker in the video display apparatus 2 to which the speaker is attached. When it is not necessary to supply the control signal to the optical reception apparatus 200, the control signal is unnecessary.

As shown in FIG. 2, the special-code encoding circuit 108 includes a timing distinction circuit 1081, special code generation circuit 1082, and encoding table hold unit 1083. The timing distinction circuit 1081 generates a section distinction signal (four bits) indicating the sections in which the horizontal synchronous signal, vertical synchronous signal, video signal, audio signal, and control signal are positioned, based on the inputted synchronous signal, audio signal section signal, and control signal section signal. The section distinction signal is inputted into the special code generation circuit 1082 and multiplex circuit 109.

Moreover, the timing distinction circuit 1081 generates a special code distinction signal (at least one bit) indicating the position of the special code, based on the inputted synchronous signal, audio signal section signal, and control signal section signal, and supplies the signal to the encoding circuit for code conversion 110. It is to be noted that a signal line of the special code distinction signal supplied to the encoding circuit for code conversion 110 from the special-code encoding circuit 108 is omitted from FIG. 1 for simplicity.

Figure 6:
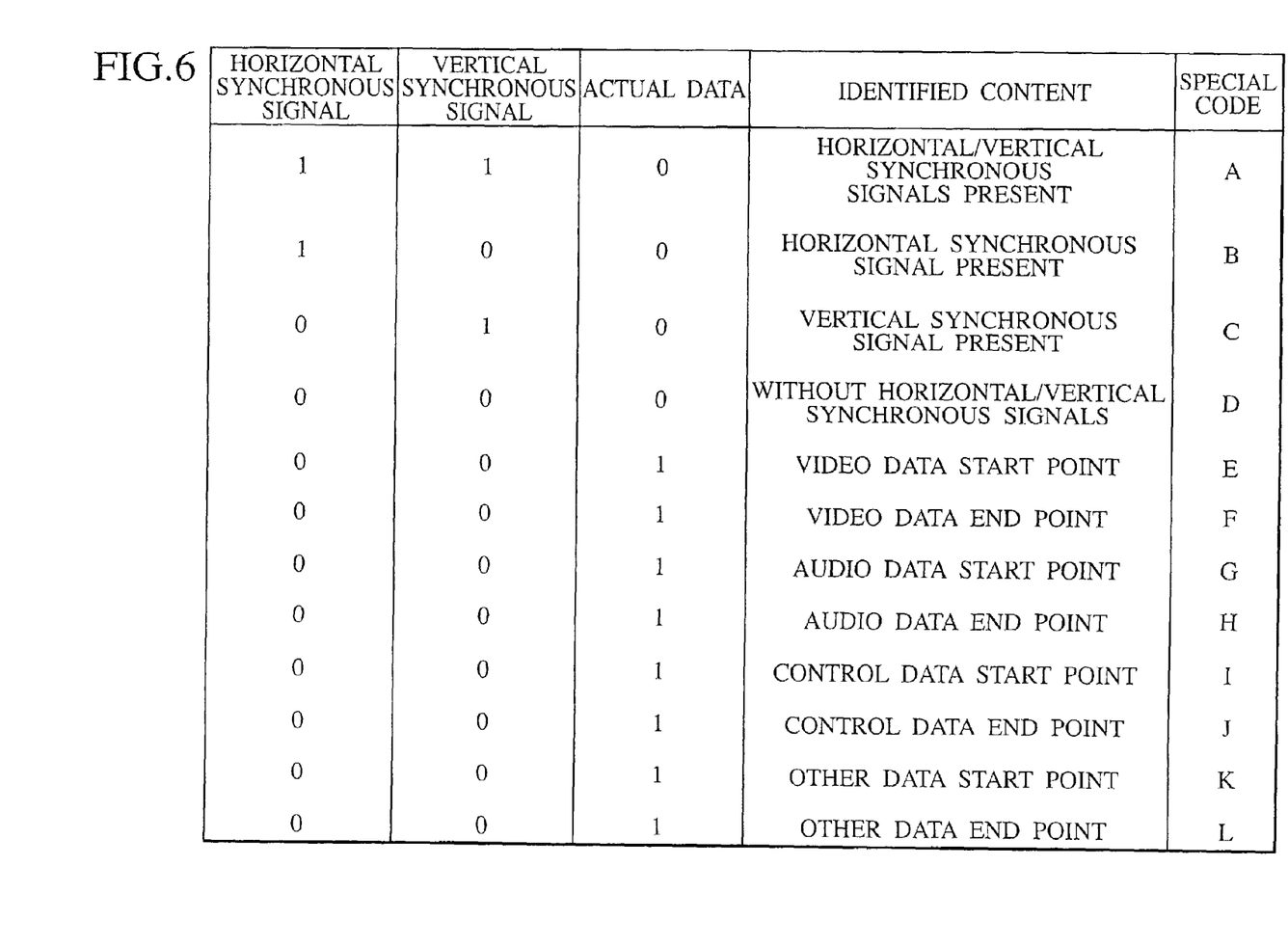
FIG. 6 is a diagram showing a use example of a special code for use in the optical transmission/reception system of the present invention.

The special code generation circuit 1082 generates the special code based on an encoding table held in the encoding table hold unit 1083. The encoding table hold unit 1083 is constituted of ROM as one example. FIG. 6 shows one example of the encode table held by the encode table hold unit 1083. In FIG. 6, a column of the horizontal synchronous signal shows presence (1), absence (0) of the horizontal synchronous signal, a column of the vertical synchronous signal shows presence (1), absence (0) of the vertical synchronous signal, and a column of the actual data shows presence (1), absence (0) of the actual data. The actual data is the data other than the horizontal and vertical synchronous signals, and includes the video, audio, and control signals in the present embodiment.

By the combination of 1 and 0 in the horizontal and vertical synchronous signals and actual data, each meaning shown in the column of an identified content is allocated. Other data start and end points in the column of the identified content are not used in the present embodiment. Moreover, special codes A to L are allocated to each identified content. It is to be noted that the special codes A to L are assumed for the sake of convenience, and the code actually includes, for example, the data of eight bits.

Additionally, in the present embodiment, the optical transmission/reception system is constituted as a system which conforms to IEEE802.3z standard of measure. In the IEEE802.3z standard of measure, an 8B/10B encoding circuit is used as the encoding circuit for code conversion 110. In the 8B/10B encoding circuit, 12 special codes are defined. In the present embodiment, 12 special codes defined in the 8B/10B encoding circuit of the IEEE802.3z standard of measure are allocated as the special codes A to L shown in FIG. 6. In the present embodiment, the identification code is referred to as the special code, because the system is constituted to conform to the IEEE802.3z standard of measure.

Turning back to FIG. 2, the multiplex circuit 109 multiplexes the inputted video signal, audio signal, control signal, and special code to output the multiplexed signal. As described above, the video signal of 16 bits inputted into the multiplex circuit 109 is converted to eight bits and outputted.

Figure 7A:
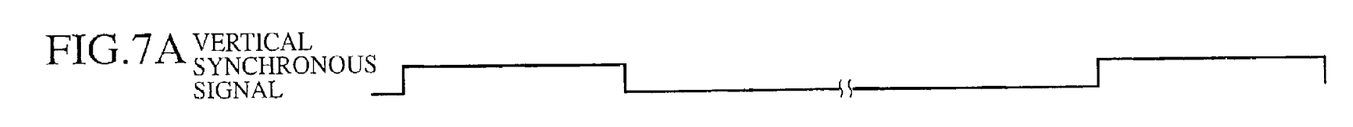
FIGS. 7A, 7B, 7C and 7D are diagrams showing an example of multiplex of data in the optical transmission/reception system of the present invention.
Figure 7B:
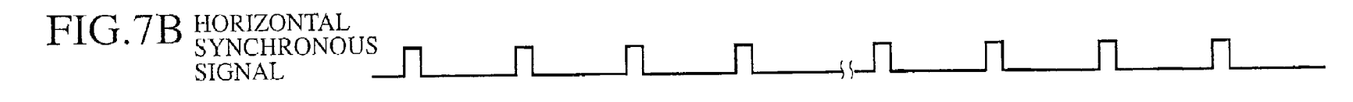
Figure 7C:
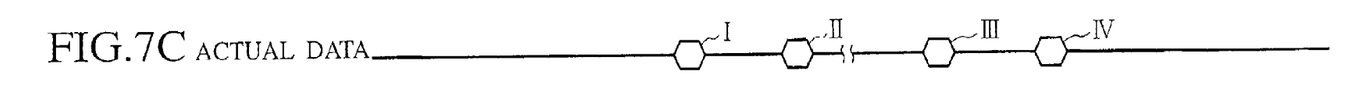
Figure 7D:
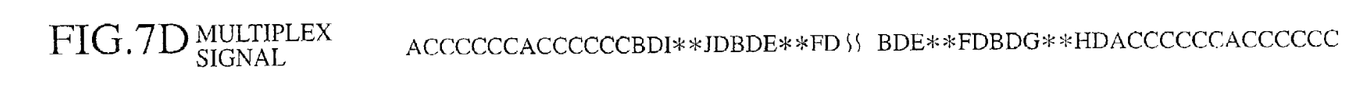

The multiplex in the multiplex circuit 109 will be described in detail with reference to FIG. 7. FIG. 7A shows the vertical synchronous signal, FIG. 7B shows the horizontal synchronous signal, FIG. 7C shows the actual data, and FIG. 7D shows a multiplex signal outputted from the multiplex circuit 109. In the actual data shown in FIG. 7C, I denotes the control signal, II and III indicate the video signals, and IV indicates the audio signal.

As shown in FIG. 7D, for the multiplex circuit 109, in a section in which the actual data does not exist, the special codes A to D generated by the special code generation circuit 1082 in accordance with the presence/absence of the horizontal and vertical synchronous signals are successively arranged. Moreover, before and after each of the control signal I, video signals II, III, and audio signal IV, the special codes E to J are arranged. Portions of the actual data shown in the control signal I, video signals II, III, and audio signal IV are shown by a symbol *. In this manner, the multiplex circuit 109 multiplexes and outputs the actual data and special codes A to J.

A multiplex signal outputted from the multiplex circuit 109 is inputted into the encoding circuit for code conversion 110. As described above, the encoding circuit for code conversion 110 is constituted of an 8B/10B encoding circuit 1101. The 8B/10B encoding circuit 1101 converts the inputted multiplex signal of eight bits to ten bits and outputs the signal. At this time, based on the inputted special code distinction signal, the 8B/10B encoding circuit 1101 encodes an actual data portion and special code portion in ten bits in such a manner that the portions can be distinguished from each other.

The transmission speed of the data outputted from the 8B/10B encoding circuit 1101 is 1.25 Gbps, and an output of the 8B/10B encoding circuit 1101 is supplied to the subsequent-stage parallel/serial conversion circuit 111. Moreover, as shown in FIG. 1, the bit stream signal is converted to the light signal and transmitted.

In the above-described embodiment, for a preferred example, as seen from FIG. 7, the section in which the actual data does not exist (i.e., a section in which the horizontal and vertical synchronous signals exist and a section in which even the horizontal and vertical synchronous signals do not exist) is preferably replaced with the special codes A to D. With respect to the actual data of the video, audio, and control signals, special codes E to J are added before and after the actual data. The special code may be added only before the actual data in a simplified manner.

As another embodiment, also with respect to the horizontal and vertical synchronous signals, the special code may also be constituted to be added before (preferably before and after) the horizontal and vertical synchronous signals so that the positions of the horizontal and vertical synchronous signals can be identified. In this case, the horizontal and vertical synchronous signals are inputted into the special-code encoding circuit 108 and multiplex circuit 109. Moreover, the special-code encoding circuit 108 generates the special code to be added to the actual data and synchronous signal, and the multiplex circuit 109 multiplexes the actual data, synchronous signal, and special codes. It is to be noted that each of the horizontal and vertical synchronous signals is converted to data of eight bits in this constitution.

Figure 3:
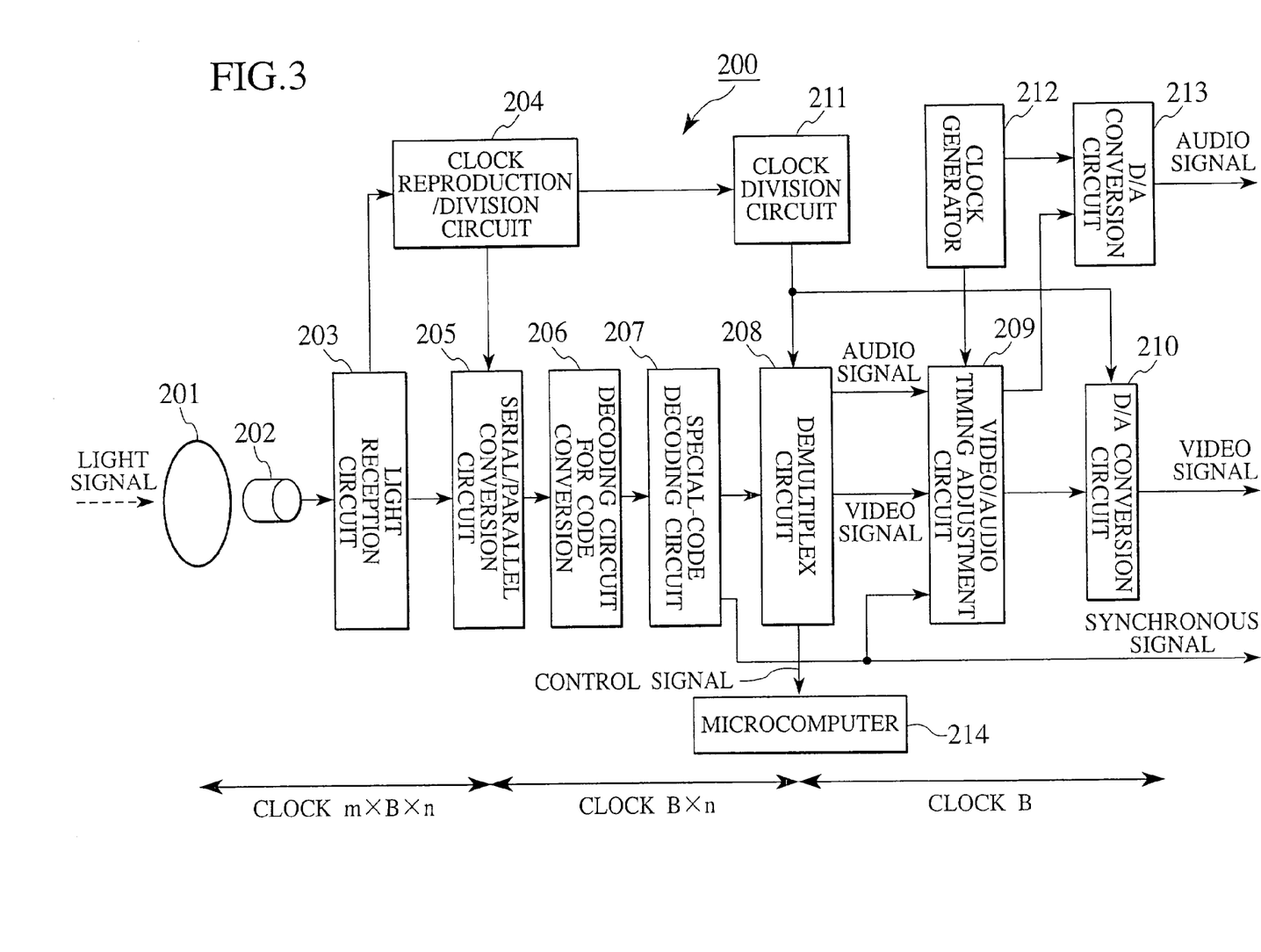
FIG. 3 is a block diagram showing one embodiment of an optical reception apparatus for use in the optical transmission/reception system of the present invention.

A concrete constitution of the optical reception apparatus 200 will next be described with reference to FIG. 3. In FIG. 3, the light signal transmitted from the optical transmission apparatus 100 or the light signal relayed by the optical relay apparatus 300 is focused by a condenser 201, and inputted into a light reception device 202 such as a photodiode. The light reception device 202 converts the light signal (light pulse) to an electric signal (electric pulse), and inputs the signal into a light reception circuit 203. The light reception circuit 203 subjects the inputted electric signal to processing such as amplification and restores the bit stream signal.

This bit stream signal is inputted into a clock reproduction/division circuit 204 and a serial/parallel conversion circuit 205. The clock reproduction/division circuit 204 reproduces the clocks m×B×n and B×n based on the inputted bit stream signal. The clocks m×B×n and B×n are inputted into the serial/parallel conversion circuit 205. The serial/parallel conversion circuit 205 uses the clocks m×B×n and B×n to convert the signal to a parallel data string which has a rate of the clock B×n. This parallel data string is inputted into a decoding circuit for code conversion 206.

The decoding circuit for code conversion 206 code-converts and decodes a signal of ten bits to an original code of eight bits. The output of the decoding circuit for code conversion 206 is inputted into a special-code decoding circuit 207. The special-code decoding circuit 207 decodes the special codes A to J. The special-code decoding circuit 207 generates the actual data, section distinction signal, and synchronous signal. The actual data and section distinction signal are inputted into a demultiplex circuit 208.

The synchronous signal outputted from the special-code decoding circuit 207 is omitted from the drawing for simplicity, and it is necessary to convert a rate by a rate conversion circuit so that the rate is adapted to the rate of the video signal outputted from the demultiplex circuit 208. The rate conversion circuit can be constituted by a D flip-flop. The synchronous signal whose rate is converted is inputted into a video/audio timing adjustment circuit 209, and supplied to a subsequent-stage circuit for video display (not shown). A concrete constitution and details of an operation of the special-code decoding circuit 207 will be described later with reference to FIG. 4.

The clock B×n outputted from the clock reproduction/division circuit 204 is inputted into a clock division circuit 211. The clock division circuit 211 divides the clock B×n and generates the clock B. This clock B is inputted into the demultiplex circuit 208 and a D/A conversion circuit 210. The demultiplex circuit 208 uses the clock B to demultiplex the output of the special-code decoding circuit 207, and separates the video, audio, and control signals.

The video and audio signals outputted from the demultiplex circuit 208 are inputted into the video/audio timing adjustment circuit 209. The control signal outputted from the demultiplex circuit 208 is inputted into a microcomputer 214 as a control unit. The microcomputer 214 controls each portion of the video display apparatus 2 based on the inputted control signal. It is to be noted that the microcomputer 116 of the optical transmission apparatus 100 of FIG. 1 operates as a master microcomputer, and the microcomputer 214 of the optical reception apparatus 200 of FIG. 3 operates as a slave microcomputer.

The clock for the audio signal is inputted into the video/audio timing adjustment circuit 209 from a clock generator 212. The video/audio timing adjustment circuit 209 adjusts the timings of the video and audio signals, and restores and outputs the original video and audio signals so as to restore the audio signal positioned in the blanking period of the video signal. The digital video signal outputted from the video/audio timing adjustment circuit 209 is inputted into the D/A conversion circuit 210, and the digital audio signal is inputted into a D/A conversion circuit 213.

The D/A conversion circuit 210 uses the clock inputted from the clock division circuit 211 to convert the digital video signal to the electric analog video signal and to output the analog video signal. This analog video signal is supplied to the video display apparatus 2, and an image is displayed. The D/A conversion circuit 213 uses the clock inputted from the clock generator 212 to convert the digital audio signal to the electric analog audio signal and to output the signal. This analog audio signal is supplied to a speaker (not shown), and outputted as sound.

Figure 4:
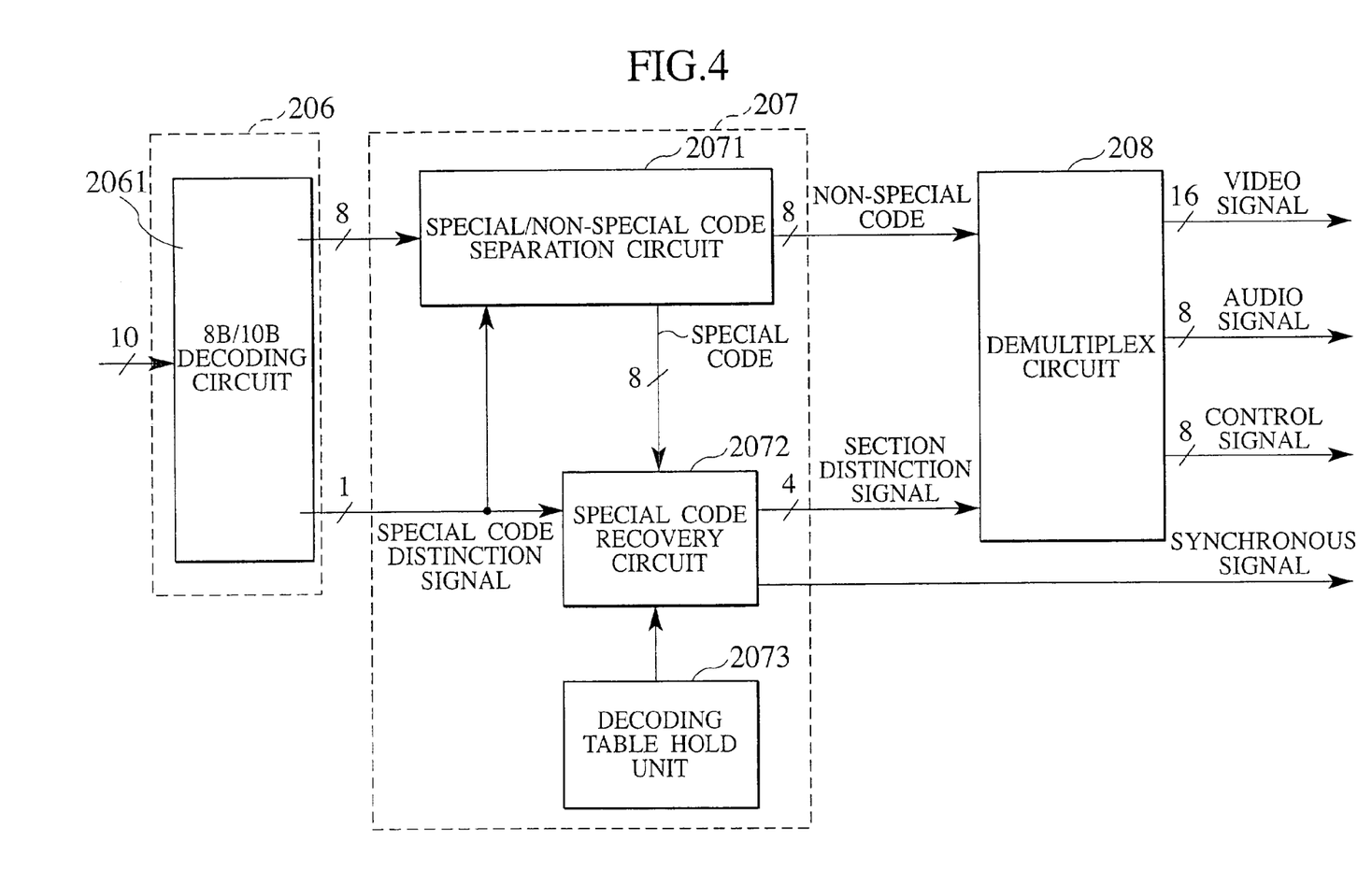
FIG. 4 is a partial detailed block diagram of FIG. 3.

Here, a concrete constitution example of the decoding circuit for code conversion 206 to demultiplex circuit 208 will be described in detail with reference to FIG. 4. As shown in FIG. 4, the decoding circuit for code conversion 206 includes an 8B/10B decoding circuit 2061. In FIG. 4, the signal of ten bits outputted from the serial/parallel conversion circuit 205 is converted to the signal of eight bits by the 8B/10B decoding circuit 2061. This signal of eight bits corresponds to the multiplex signal shown in FIG. 7D. At this time, the 8B/10B decoding circuit 2061 generates and outputs a special code distinction signal (at least one bit) for identifying whether the signal is the special code or the actual data.

The multiplex signal of eight bits and special code distinction signal outputted from the 8B/10B decoding circuit 2061 are inputted into the special-code decoding circuit 207. The special-code decoding circuit 207 includes a special/non-special code separation circuit 2071 for separating the special code and non-special code (i.e., actual data), special code recovery circuit 2072, and decoding table hold unit 2073. The special/non-special code separation circuit 2071 separates the special code and actual data (non-special code) based on the inputted special code distinction signal, supplies the actual data to the demultiplex circuit 208, and supplies the special code to the special code recovery circuit 2072.

A decoding table which has the same content as that of the encode table described with reference to FIG. 6 is held in the decoding table hold unit 2073. The special code recovery circuit 2072 restores the special code based on the decoding table held in the decode table hold unit 2073. It is to be noted that the special code distinction signal is inputted into the special code recovery circuit 2072 in order to inform the special code recovery circuit 2072 of a period for restoring the special code.

The special code recovery circuit 2072 restores the special code, generates a section distinction signal (four bits) indicating the sections in which the video, audio, and control signals are positioned, and supplies the signal to the demultiplex circuit 208. Moreover, the special code recovery circuit 2072 generates the horizontal and vertical synchronous signals shown in FIGS. 7A, 7B based on the special codes A to C among the recovered special codes.

The demultiplex circuit 208 demultiplexes the inputted actual data (non-special code) based on the section distinction signal, and separately outputs the video, audio, and control signals. The video signal of eight bits inputted into the demultiplex circuit 208 is converted to the signal of 16 bits and outputted.

Additionally, as described as another embodiment of the optical transmission apparatus 100, for the constitution in which the special code is added to the horizontal and vertical synchronous signals, the special-code decoding circuit 207 and demultiplex circuit 208 of the optical reception apparatus 200 may be constituted as follows. The special-code decoding circuit 207 supplies the actual data and synchronous signal as the non-special codes to the demultiplex circuit 208. Moreover, the demultiplex circuit 208 separately outputs the video, audio, control, and synchronous signals based on the section distinction signal.

Figure 5:
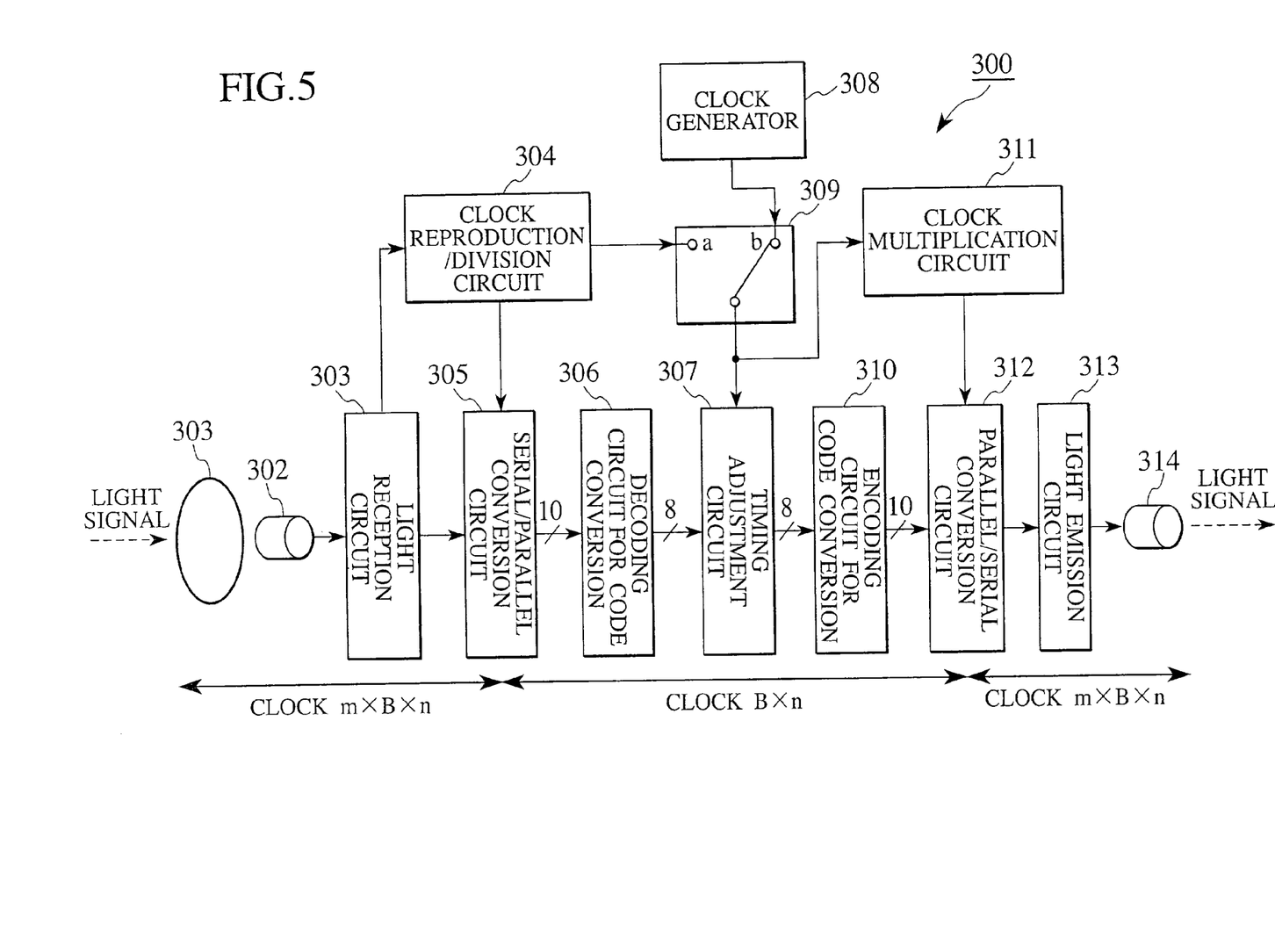
FIG. 5 is a block diagram showing one embodiment of an optical relay apparatus for use in the optical transmission/reception system of the present invention.

A concrete constitution of the optical relay apparatus 300 will next be described with reference to FIG. 5. In FIG. 5, the light signal transmitted from the optical transmission apparatus 100 is focused by a focus lens 301, and inputted into a light reception device 302 such as the photodiode. The light reception device 302 converts the light signal (light pulse) to the electric signal (electric pulse), and inputs the signal into a light reception circuit 303. The light reception circuit 303 subjects the inputted electric signal to processing such as amplification and restores the bit stream signal.

The bit stream signal is inputted into a clock reproduction/division circuit 304 and a serial/parallel conversion circuit 305. The clock reproduction/division circuit 304 reproduces the clocks m×B×n and B×n based on the inputted bit stream signal. The clocks m×B×n and B×n are inputted into the serial/parallel conversion circuit 305. The serial/parallel conversion circuit 305 uses the clocks m×B×n and B×n to convert the signal into the parallel data string which has a rate of clock B×n.

The parallel data string outputted from the serial/parallel conversion circuit 305 is of ten bits, and is inputted into a decoding circuit for code conversion 306. The decoding circuit for code conversion 306 code-converts and decodes the signal of ten bits to the code of eight bits. The parallel data string of eight bits outputted from the decoding circuit for code conversion 306 is inputted into a timing adjustment circuit 307.

The clock B×n outputted from the clock reproduction/division circuit 304 is inputted into a terminal a of a switch 309. A clock generator 308 generates the clock B×n not based on the bit stream signal generated by the light reception circuit 303, and supplies the clock to a terminal b of the switch 309. The switch 309 makes a connection via either the terminal a or b, and supplies the clock B×n outputted from either the clock reproduction/division circuit 304 or clock generator 308 to the timing adjustment circuit 307.

The clock B×n outputted from the clock reproduction/division circuit 304 sometimes has a deteriorated S/N ratio or contains many jitter components. In this case, the switch 309 selects the terminal b, and supplies the clock B×n which has a good S/N ratio and does not contain any jitter component and which is outputted from the clock generator 308 to the timing adjustment circuit 307.

In the present embodiment, for a preferred example, occurrence of a disadvantage generated by the supply of the clock outputted from the clock generator 308 into the timing adjustment circuit 307 is assumed, and thus the switch 309 is disposed. Thereby, the clock generated based on the bit stream signal from the light reception circuit 303 can be supplied to the timing adjustment circuit 307. The switch 309 may manually or automatically be switched.

The timing adjustment circuit 307 re-samples the parallel data string from the decoding circuit for code conversion 306 by the inputted clock B×n, and thereby adjusts the timing. The timing adjustment circuit 307 can be constituted of a FIFO memory as one example. The parallel data string of eight bits whose timing is adjusted by the timing adjustment circuit 307 is inputted into an encoding circuit for code conversion 310. The encoding circuit for code conversion 310 code-converts and encodes the signal of eight bits into the code of ten bits.

The parallel data string of ten bits outputted from the encoding circuit for code conversion 310 is inputted into a parallel/serial conversion circuit 312. The clock B×n outputted from the switch 309 is inputted into and multiplied by a clock multiplication circuit 311. The clock multiplication circuit 311 supplies the clock m×B×n which has a frequency m times that of the clock B×n to the parallel/serial conversion circuit 312.

The parallel/serial conversion circuit 312 uses the clock m×B×n to convert the parallel data string outputted from the encoding circuit for code conversion 310 into serial data, and inputs the data as the bit stream signal into a light emission circuit 313. The light emission circuit 313 converts the voltage level of the inputted bit stream signal to the driving voltage level of a light emission device 314, and supplies the signal to the light emission device 314. As a preferred embodiment, the semiconductor laser is used as the light emission device 314. The light emission device 314 establishes one-to-one correspondence between high/low of the bit stream signal and on/off of light, converts the bit stream signal to the light signal, and transmits the light signal.

With the semiconductor laser for use as the light emission device 314, it is natural to use the laser which does not adversely affect human eyes to the utmost. Further to secure safety, a diffusion lens for diffusing the light may also be disposed in the stage subsequent to the light emission device 314.

Since the optical relay apparatus 300 described above amplifies the signal by the light reception circuit 303 or light emission circuit 313, a transmission distance between the optical transmission apparatus 100 and optical reception apparatus 200 can be lengthened.

It is to be noted that the optical relay apparatus 300 preferably includes a mechanism capable of adjusting an angle of a light emission axis with respect to a light reception axis. Concretely, an angle adjustment function of horizontal and vertical directions is disposed in one or preferably both of a portion of the focus lens 301 and light reception device 302, and the light emission device 314. Thereby, the light signal having high rectilinearity can be refracted in a direction desired by the user. It is to be noted that when it is not necessary to amplify the light signal and an object is only to refract the light axis, then the output of the light receiving circuit 303 may directly be supplied to the light emission circuit 313 in the constitution.

The present invention is not limited to the above-described embodiment. In the present embodiment, a constitution in which the video, audio, and control signals are transmitted/received has been described, but any one of the video, audio, and control signals may also be transmitted/received in the constitution, or arbitrary two signals among these signals may also be transmitted/received in the constitution. Moreover, as the preferred embodiment, the transmission/reception between the optical transmission apparatus 100 and optical reception apparatus 200 is performed by radio, but wired transmission/reception by an optical fiber is also possible.

As described above in detail, since the optical transmission apparatus, optical reception apparatus, and optical relay apparatus in the optical transmission/reception system of the present invention are constituted as described above, the high-capacity signals such as the high vision video signal can be transmitted/received with a high quality. Moreover, even the video signal which cannot originally be displayed by the video display apparatus can also be transmitted/received and displayed, and the display capability of the video display apparatus can be fulfilled at the maximum.

It should be understood that many modifications and adaptations of the invention will become apparent to those skilled in the art and it is intended to encompass such obvious modifications and changes in the scope of the claims appended hereto.

What is claimed is:

1. An optical transmission apparatus for use in an optical transmission/reception system in which an electric signal comprising a digital signal including at least a video signal and horizontal and vertical synchronous signals of the video signal is converted to a light signal and then transmitted and in which the light signal is received and converted to the electric signal comprising the digital signal, the apparatus comprising:
    a first encoder for generating at least a first identification code indicating presence of both the horizontal synchronous signal and the vertical synchronous signal, a second identification code indicating presence of the horizontal synchronous signal, a third identification code indicating presence of the vertical synchronous signal, and a fourth identification code indicating a start position of the video signal;
    a multiplexer for multiplexing the video signal and the first to fourth identification codes while arranging the fourth signal ahead of the video signal to output a signal obtained by the multiplexing as a first data string which has a first bit number;
    a second encoder for converting an output of the multiplexer to a second data string which has a second bit number larger than the first bit number;
    a bit stream converter for converting the second data string to a bit stream signal; and
    a light emitter for transmitting the bit stream signal as the light signal.

2. The optical transmission apparatus according to claim 1, further comprising:
    a format converter, disposed in a stage before the first encoder, for format-converting the video signal to decrease or increase a number of lines or pixels of the video signal.

3. The optical transmission apparatus according to claim 1, wherein the optical transmission/reception system conforms to IEEE802.3z standard of measure, and the second encoder includes an 8B/10B encoding circuit for encoding the first data string of eight bits to the second data string of ten bits.

4. An optical reception apparatus for use in an optical transmission/reception system in which an electric signal comprising a digital signal including at least a video signal and horizontal and vertical synchronous signals of the video signal is converted to a light signal and then transmitted and in which the light signal is received and converted to the electric signal comprising the digital signal, the apparatus comprising:
    light receiver for receiving the light signal and converting the light signal to an electric bit stream signal, the light signal being based on a bit stream signal obtained by conversion of a first data string having a first bit number, the first data string being obtained by conversion of a second data string having a second bit number equal to or smaller than the first bit number, the second data string being obtained by multiplexing the video signal, a first identification code indicating presence of both the horizontal synchronous signal and the vertical synchronous signal, a second identification code indicating presence of the horizontal synchronous signal, a third identification code indicating presence of the vertical synchronous signal, and a fourth identification code arranged ahead of the video signal and indicating a start position of the video signal;
    a converter for converting the electric bit stream signal to the first data string;
    a first decoder for converting an output of the converter to the second data string; and
    a second decoder for separating the video signal based on the first fourth identification code included in the second data string and generating the horizontal and vertical synchronous signals based on the first, second and third identification codes.

5. The optical reception apparatus according to claim 4, wherein the optical transmission/reception system conforms to IEEE802.3z standard of measure, and the first decoder includes an 8B/10B decoding circuit for decoding the first data string of ten bits to the second data string of eight bits.

* * * * *